(12) United States Patent
Delaney et al.

(10) Patent No.: US 7,372,953 B2
(45) Date of Patent: *May 13, 2008

(54) METHODS AND SYSTEMS FOR DEFAULT ROUTING IN A SIGNALING NETWORK

(75) Inventors: Robert J. Delaney, Raleigh, NC (US); Todd Eichler, Wake Forest, NC (US)

(73) Assignee: Tekelec, Morrisville, NC (US)

( * ) Notice: Subject to any disclaimer, the term of this patent is extended or adjusted under 35 U.S.C. 154(b) by 1073 days.

This patent is subject to a terminal disclaimer.

(21) Appl. No.: 10/446,424

(22) Filed: May 28, 2003

(65) Prior Publication Data

US 2004/0240658 A1    Dec. 2, 2004

(51) Int. Cl.
*H04M 7/00* (2006.01)
(52) U.S. Cl. .................. 379/221.08; 379/219
(58) Field of Classification Search ........... 379/221.08, 379/112, 219, 229, 230, 220.1, 221.09; 370/410
See application file for complete search history.

(56) References Cited

U.S. PATENT DOCUMENTS

| | | |
|---|---|---|
| 4,577,066 A | 3/1986 | Bimonte et al. |
| 4,752,924 A | 6/1988 | Darnell et al. |
| 5,008,929 A | 4/1991 | Olsen et al. |
| 5,384,840 A | 1/1995 | Blatchford et al. |
| 5,481,673 A | 1/1996 | Michelson |
| 5,592,477 A | 1/1997 | Farris et al. |
| 5,592,530 A | 1/1997 | Brockman et al. |
| 5,708,702 A | 1/1998 | De Paul et al. |
| 5,898,667 A | 4/1999 | Longfield et al. |

(Continued)

FOREIGN PATENT DOCUMENTS

EP    0 912 068 A2    4/1999

(Continued)

OTHER PUBLICATIONS

GR-310-CORE, "CSS Operations System (CCS OS)—STP Interface Specification," Issue 3, Telcordia Technologies, pp. 2-3, 7-1-7-14, 7-23-7-24, 8-25, 7-148-7-152, 7-316-7-320, 12-4-12-9, and B-10 (Dec. 2002).

(Continued)

*Primary Examiner*—William J. Deane, Jr.
(74) *Attorney, Agent, or Firm*—Jenkins, Wilson, Taylor & Hunt, P.A.

(57) ABSTRACT

Methods and systems for routing SS7 messages based on DPC-based routing rules and non-DPC-based routing rules are disclosed. For a message containing signaling system 7 (SS7) information, a message routing function at an SS7 signaling message routing node searches a list of message routing rules using a search key including a DPC parameter extracted from the signaling message. If a matching entry is not located in the first routing rule list, a default SS7 routing rule may be used to route the message. The default routing rule may include wildcard values for each of the network ID, network cluster, and cluster member components of the DPC address field. Multiple default routing rules may be defined using various SS7 discriminator parameters. In addition, new DPC-based routing rules can be created and added to the list of DPC-based routing rules based on lookups in the set of non-DPC-based routing rules.

29 Claims, 8 Drawing Sheets

U.S. PATENT DOCUMENTS

| | | |
|---|---|---|
| 6,175,574 B1 | 1/2001 | Lewis |
| 6,226,289 B1 | 5/2001 | Williams et al. |
| 6,282,191 B1 | 8/2001 | Cumberton et al. |
| 6,327,267 B1 | 12/2001 | Valentine et al. |
| 6,327,270 B1 | 12/2001 | Christie et al. |
| 6,470,080 B2 | 10/2002 | Perlmutter |
| 6,535,746 B1 | 3/2003 | Yu et al. |
| 6,577,723 B1 | 6/2003 | Mooney |
| 6,662,017 B2 | 12/2003 | McCann et al. |
| 6,757,538 B1 | 6/2004 | Howe |
| 6,792,100 B2 | 9/2004 | Nekrasovskaia et al. |
| 6,836,477 B1 | 12/2004 | West, Jr. et al. |
| 6,842,506 B1 | 1/2005 | Bedingfield |
| 7,058,724 B1 | 6/2006 | Das et al. |
| 7,088,728 B2 | 8/2006 | Delaney et al. |
| 7,116,774 B2 | 10/2006 | Gradischnig |
| 2002/0071543 A1 | 6/2002 | Wiliams |
| 2002/0131427 A1 | 9/2002 | Niermann |
| 2002/0186702 A1 | 12/2002 | Ramos et al. |
| 2003/0206562 A1 | 11/2003 | Yl |
| 2004/0081206 A1* | 4/2004 | Allison et al. ............... 370/522 |
| 2004/0114533 A1 | 6/2004 | Angermayr et al. |
| 2004/0137904 A1 | 7/2004 | Gradischnig |

FOREIGN PATENT DOCUMENTS

| | | |
|---|---|---|
| EP | 1 111 940 A1 | 6/2001 |
| WO | WO 97/11563 | 3/1997 |
| WO | WO 99/67928 | 12/1999 |

OTHER PUBLICATIONS

GR-82-CORE, "Signaling Transfer Point (STP) Generic Requirements," Issue 5, Telcordia Technologies, pp. 2-5-2-10, 3-2-3-3, 4-2-4-103, D-1-D-30, and J-21-J-28 (Dec. 2001).

* cited by examiner

METHODS AND SYSTEMS FOR DEFAULT ROUTING IN A SIGNALING NETWORK

TECHNICAL FIELD

The present invention relates to routing signaling messages in a communications network. More particularly, the present invention relates to methods and systems for routing a signaling message to a default destination based on one or more parameters contained in the message.

BACKGROUND ART

In a signaling system 7 (SS7) network, signal transfer point (STP) nodes are employed to route SS7 signaling messages through the network. Conventional STP operation involves the routing of SS7 messages based on a destination point code (DPC) value contained in a message transfer part (MTP) routing label in the SS7 messages. Such routing is commonly referred to as MTP routing. One type of SS7 message that is subject to MTP routing is an ISDN user part (ISUP) message. FIG. 1 illustrates an example of an ISUP message. In FIG. 1, ISUP message 100 includes an origination point code (OPC) 102, a DPC 104, and a signaling indicator 106, as well as a number of other well defined parameters. ISUP messages are usually routed based on DPC 104. Another type of SS7 message is a signaling connection control part (SCCP) message. SCCP messages may include a field referred to as a global title address that must be translated into a DPC value before MTP routing can be performed. Thus, like ISUP messages, SCCP messages are routed based on DPC values after GTT is performed.

Signaling links connected to an STP are organized into groups of up to 16. Each group is known as a linkset. All signaling links in a linkset terminate at the same adjacent node. In a combined linkset, all signaling links in the combined linkset terminate at the same mated pair of adjacent nodes. STP nodes are typically provisioned to distribute message transmission across all of the links in a linkset for load sharing purposes. For the same linkset, SLS is used inherently in the protocol to distribute the load among the links in a linkset. Typically, different linksets (routes) are used to get to the same DPC for diversity. The route chosen is typically provisioned by relative cost.

In addition to signaling links and linksets, signaling routes are also defined at STPs and other nodes, such as signaling gateways. A signaling route may include one or more signaling linksets. An STP may maintain a cost value associated with each route, and route availability is affected by received network management information. When multiple routes to the same destination exist, the STP may select the lowest cost route to the destination. Thus, all messages received at an STP that are addressed to a particular DPC will be routed to the appropriate destination via the first available, lowest cost route. Such a routing mechanism ensures that a message will be routed to the appropriate DPC via the lowest cost route.

An SS7 point code typically includes three address components: a network identifier component, a network cluster component, and a cluster member component (ITU-N not). As discussed in *GR-82-CORE Signal Transfer Point (STP) Generic Requirements*, Issue 5, Telecordia Technologies, December 2001, the disclosure of which is incorporated herein by reference in its entirety, when determining a route over which a message should be sent, a routing node may use the full DPC specified in the message, examining the network ID, network cluster, and cluster member components, or it may use only the network ID and network cluster portions of the DPC to determine the proper outgoing route. In the full DPC case, a routing node consults a member route set. This type of routing is referred to as full point code or member routing. In the case where only the network and cluster portions are used, the routing node consults a cluster route set. This type of routing is referred to as cluster routing.

Cluster routing and cluster management are procedures that use partial point code information (i.e., the network ID and network cluster fields of the DPC present in each SS7 message) to route messages and perform network management functions. These procedures also include determining how to respond to signaling route management messages that refer to clusters. As such, cluster routing involves the implementation of one or more routing rules that allow the cluster member component of the point code address to be wildcarded (i.e., utilize a wildcard operator that represents any valid cluster member value), as indicated below in Table 1.

TABLE 1

Conventional Routing Rule Examples

| Network ID | Network Cluster | Cluster Member | Linkset |
|---|---|---|---|
| 8 | 1 | * | LS1 |
| 6 | * | * | LS3 |
| 10 | 2 | 12 | LS5 |

As illustrated in the first entry in Table 1, a received signaling message with a DPC that includes a network ID value of 8 and a network cluster value of 1 will be routed over linkset LS1. The cluster member field is a wildcard. Thus, the cluster member value is not used in routing a received signaling message with a DPC having a network ID of 8 and a network cluster value of 1.

In 1994, the assignee of the present invention developed a network routing solution that extended the cluster routing concept. This network routing solution defined two types of partial point codes, network only point codes and network/cluster partial point codes. With this solution, a wildcard operator (e.g., the number 255) could be specified for the cluster member component or both the cluster member and network cluster components of a routing rule. Consequently, all messages addressed to a particular network ID could be routed using a single routing rule, and/or all messages addressed to a particular network ID and network cluster could be routed using a single routing rule. The second entry in Table 1 illustrates this type of conventional routing. In the second entry, the network cluster and cluster member fields are wildcarded. The network ID field is the only field used to route messages. The assignee of the present invention developed a second network-only routing solution in 2000. However, even with this solution, message arriving for a network not provisioned in the routing table would be discarded.

The third sample routing rule entry in Table 1 illustrates a full point code routing rule that does not include a wildcard operator. Thus, only messages addressed specifically to member 12 of cluster 2 of network 10 will be routed over linkset LS5.

While cluster and network routing have proven to be useful in SS7 networks, one problem with these conventional routing schemes is that messages will be discarded if a matching entry is not present in a network routing table.

Referring again to the routing rule examples in Table 1, if a signaling message having a DPC of 2-2-2 is received by a routing node that has implemented these routing rules, the message would be discarded because there is no routing rule defined for a message with such a destination address.

An exemplary network diagram illustrating such a message routing scenario is presented in FIG. 2. In FIG. 2, a signaling network 150 includes end office signaling facilities 152, 154, 156 and 158, edge router STP 160 and central STP 162. In this example, it is assumed that SSP 156 has a point code of 2-2-2. Edge router STP 160 may have limited processing capacity and thus its routing tables may not have entries for all nodes in the network. In this example, it is assumed that edge router STP 160 does not have a specific routing table entry for SSP 156. Accordingly, when edge router STP 160 receives a message destined for SSP 156, the message will be discarded. When the MSU in FIG. 2 is discarded due to lack of a routing table entry, an error message may be returned to the message originator, but the original message is not routed to its destination, because a route to the destination 2-2-2 has not been defined in the routing table of edge router STP 160.

One reason for the routing problem illustrated in FIG. 2 is that telecommunications industry standards documents mandate that SS7 messages be discarded if no routing table entry exists that matches the DPCs in the messages. For example, according to *GR-310-CORE, CSS Operations System STP Interface Specification*, Issue 2, Telecordia Technologies, December 2002 an MTP routing function should discard a received signaling message when the MSU's DPC does not match the routing node's self-identity (i.e., an STP's unique signaling point code or any of its capability codes) and does not have a route specified for it in a routing rule set or table. Because signal transfer points have conventionally followed the industry standards rules as specified in GR-310-CORE, if a signal transfer point receives a message that is not addressed to it and for which it does not have a specific route, the message is discarded. This result is undesirable, since some limited capacity STPs, such as edge router STPs, may not have routing table entries for every point code in the network. As a result, legitimate message traffic may be discarded. Accordingly, there exists a need for improved methods and systems for routing signaling messages at signal transfer points.

DISCLOSURE OF THE INVENTION

The present invention may include a signaling message routing node, such as a signal transfer point or a signaling gateway, for maintaining and applying one or more message routing rules, including a default message routing rule. For ISUP and SCCP messages, a message routing function associated with the routing node may examine message parameters including the OPC, DPC, and SI parameters to select a route to the DPC. With particular regard to SCCP messages, global title translation may be performed to determine the intended DPC, and the OPC parameter examined by the message routing function in selecting the route may be the OPC value stored in an SCCP calling party address field in the message.

The message routing function may search a list of message routing rules using a search key including a DPC parameter extracted from a signaling message. The DPC in the search key may be a full DPC including a network ID component, a network cluster component, and a cluster member component. If a matching entry for the full point code is not located in a routing table, a default routing rule is employed to route the message. The default routing rule may include wildcard values for each of the network ID, network cluster, and cluster member components of the DPC address field.

In one exemplary implementation, multiple default routing rules may be defined, where each default routing rule includes a completely wildcarded DPC and a different non-DPC discriminator. The non-DPC discriminator may be an OPC parameter value, a SI value, circuit identification code (CIC) value or other suitable SS7 message parameter.

Specific instances of default routing rules may be provisioned in a dynamic routing table. An entry in the dynamic routing table may be "bumped" from the table and replaced with a new entry based on usage, importance, or operator preference. Systems equipped with a dynamic routing table may provide improved route resolution performance via faster database/table lookup times.

The methods and system for providing default SS7 routing are described herein as functions, modules or processes. It is understood that these functions, modules or processes may be implemented in software. Alternatively, the functions, modules or processes described herein may be implemented entirely in hardware. In yet another alternative, the functions, modules or processes described herein may be implemented using firmware. Any combination of hardware, software, and/or firmware for performing route selection as described herein is intended to be within the scope of the invention.

The modules, functions or processes for providing default routing are described below as being associated with cards or subsystems within a routing node. It is understood that these cards or subsystems include hardware for storing and executing the functions, processes, and modules. For example, each card or subsystem described below may include one or more microprocessors, such as a Pentium® or Xeon® microprocessor available from Intel Corporation or any of the K series of microprocessors available from AMD Corporation, and associated memory.

Accordingly, it is an object of the present invention to provide methods and systems for routing SS7 messages in an SS7 signaling network using a default routing rule.

It is yet another object of the present invention to provide a routing node that is capable of generating usage measurements and billing data associated with messages routed using a default routing rule.

Some of the objects of the invention having been stated hereinabove, other objects will become evident as the description proceeds, when taken in connection with the accompanying drawings as best described hereinbelow.

BRIEF DESCRIPTION OF THE DRAWINGS

A description of preferred embodiments of the present invention will now be explained with reference to the accompanying drawings of which.

DETAILED DESCRIPTION OF THE INVENTION

Figure 1:
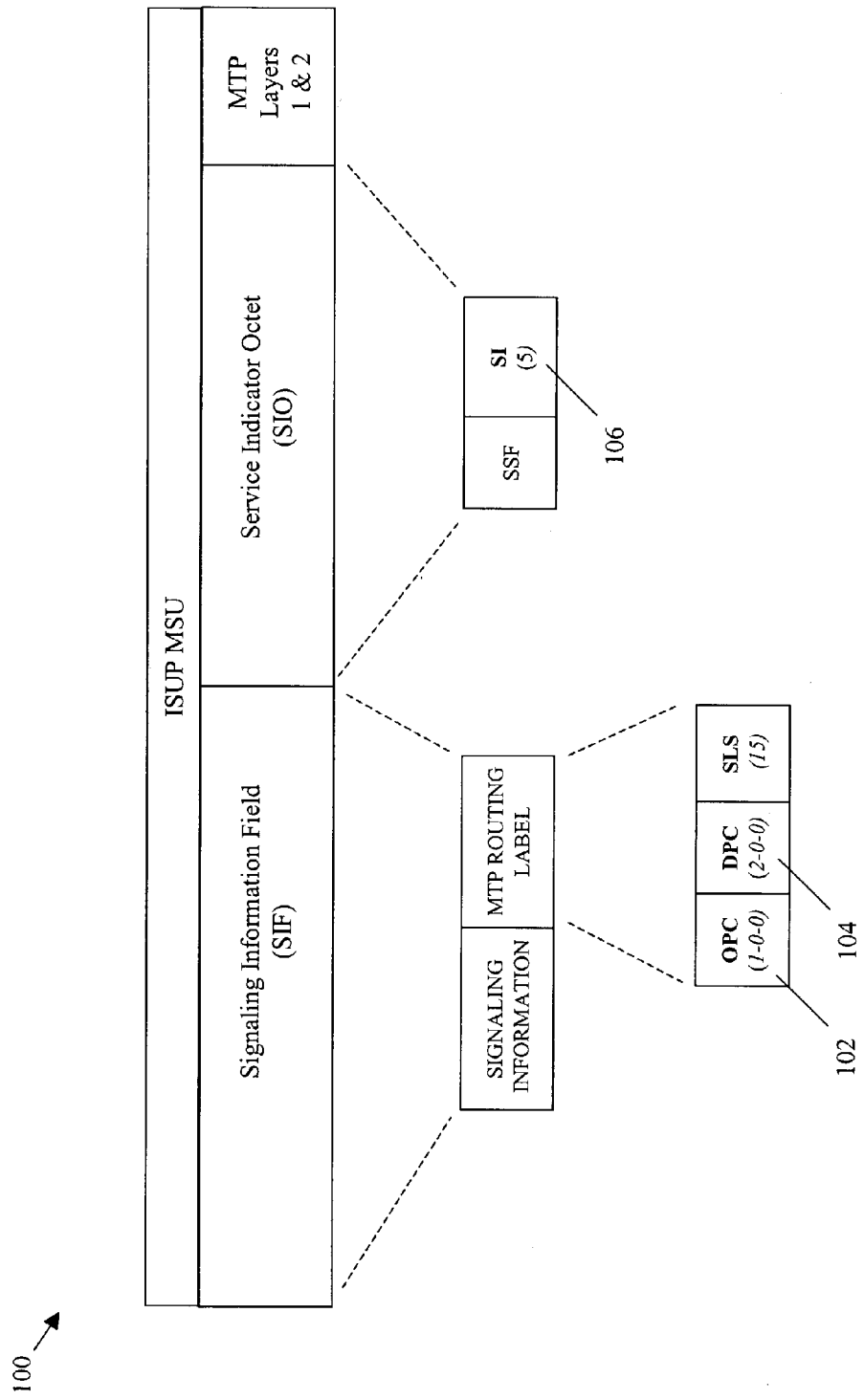
FIG. 1 is a block diagram illustrating exemplary parameters contained within a an ISUP message.
Figure 2:
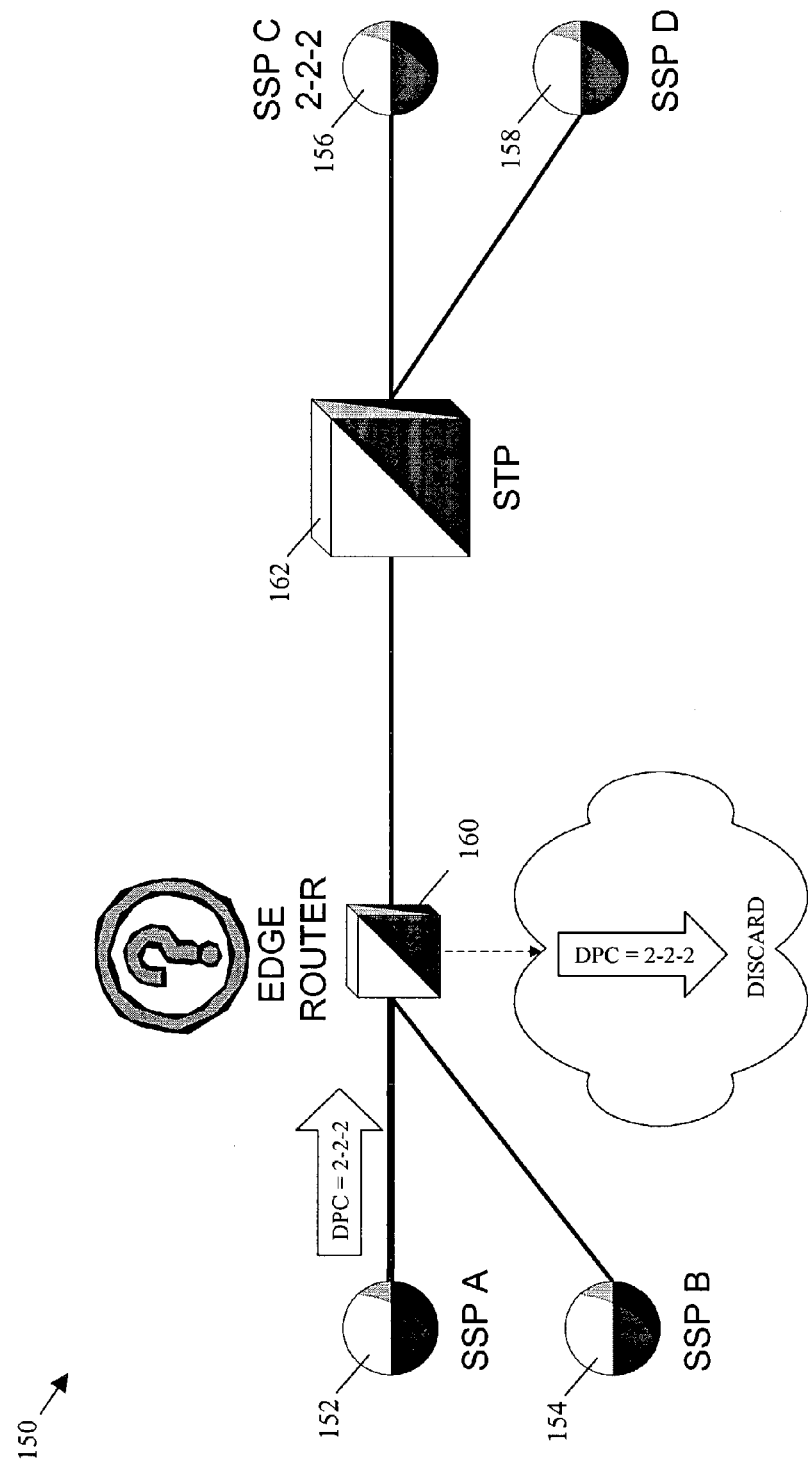
FIG. 2 is a network diagram illustrating a typical SS7 routing scenario involving the receipt of a message by an SS7 routing node that does not have a routing rule defined for the DPC in the signaling message.
Figure 3:
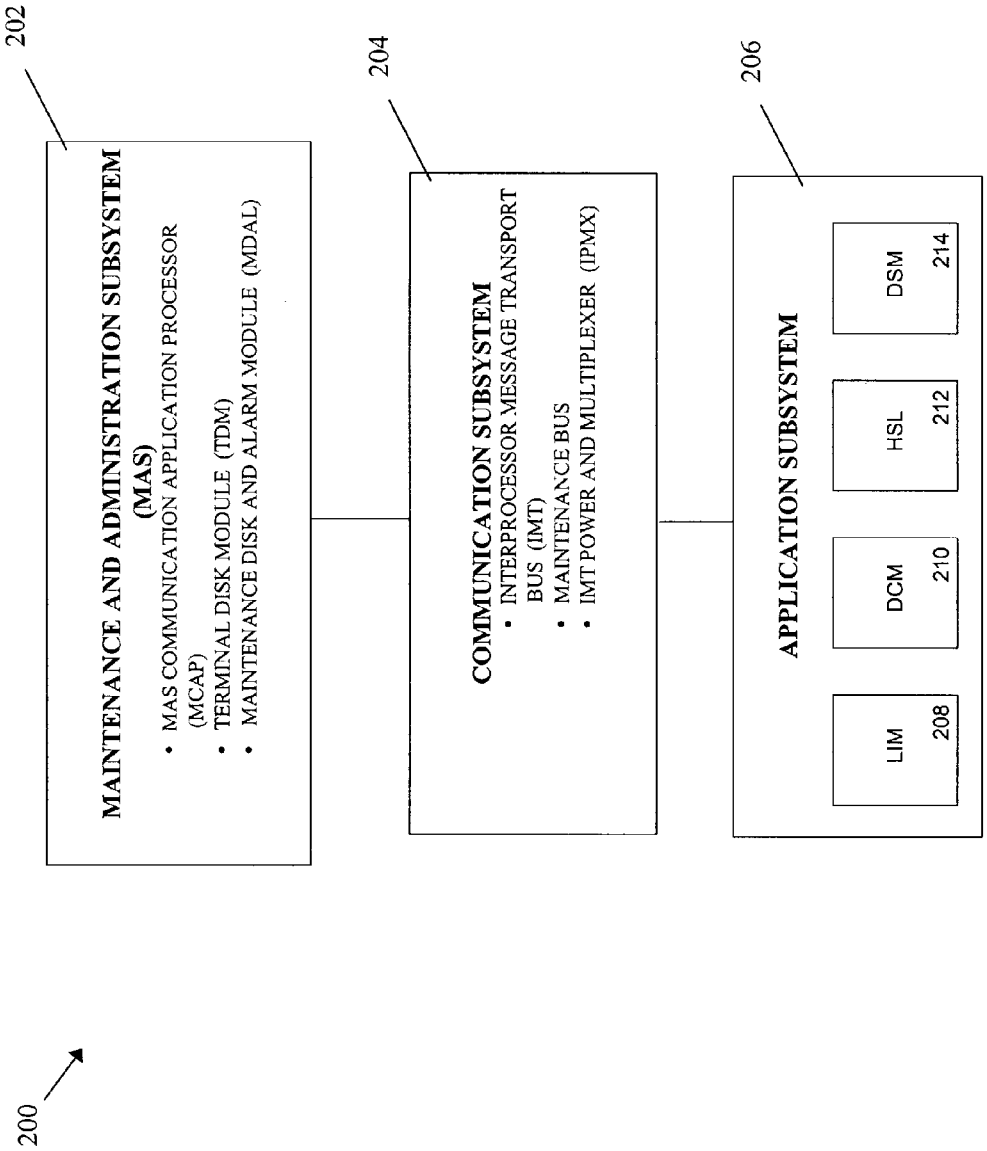
FIG. 3 is a block diagram illustrating an exemplary architecture of a signaling gateway (SG) routing node suitable for use with embodiments of the present invention.

Disclosed herein are several embodiments of the present invention, which may include an underlying hardware platform similar to that of a signal transfer point or a signaling gateway. FIG. 3 is a block diagram illustrating an exemplary signaling gateway node 200, which employs a distributed, multi-processor system architecture suitable for use with embodiments of the present invention. As shown in FIG. 3, a signaling gateway 200 includes the following subsystems: a maintenance and administration subsystem (MAS) 202, a communication subsystem 204 and an application subsystem 206. MAS 202 provides maintenance communications, initial program loading, peripheral services, alarm processing and system disks. Communication subsystem 204 includes an interprocessor message transport (IMT) bus that is the main communication bus among subsystems in signaling gateway 200. The IMT bus includes 1 Gbps counter-rotating serial rings.

Application subsystem 206 includes application cards or printed circuit boards capable of communicating with the other cards through the IMT bus. Numerous types of application cards can be included in signaling gateway 200. Exemplary application cards include a link interface module (LIM) 208 that provides SS7 links and X.25 links, a data communication module (DCM) 210 that provides an Internet protocol (IP) signaling interface to external nodes, and a high-speed asynchronous transfer mode (ATM) communication link module (HSL) 212. A database service module (DSM) 214 includes database-related applications, such as global title translation and number portability translation applications.

Figure 4:
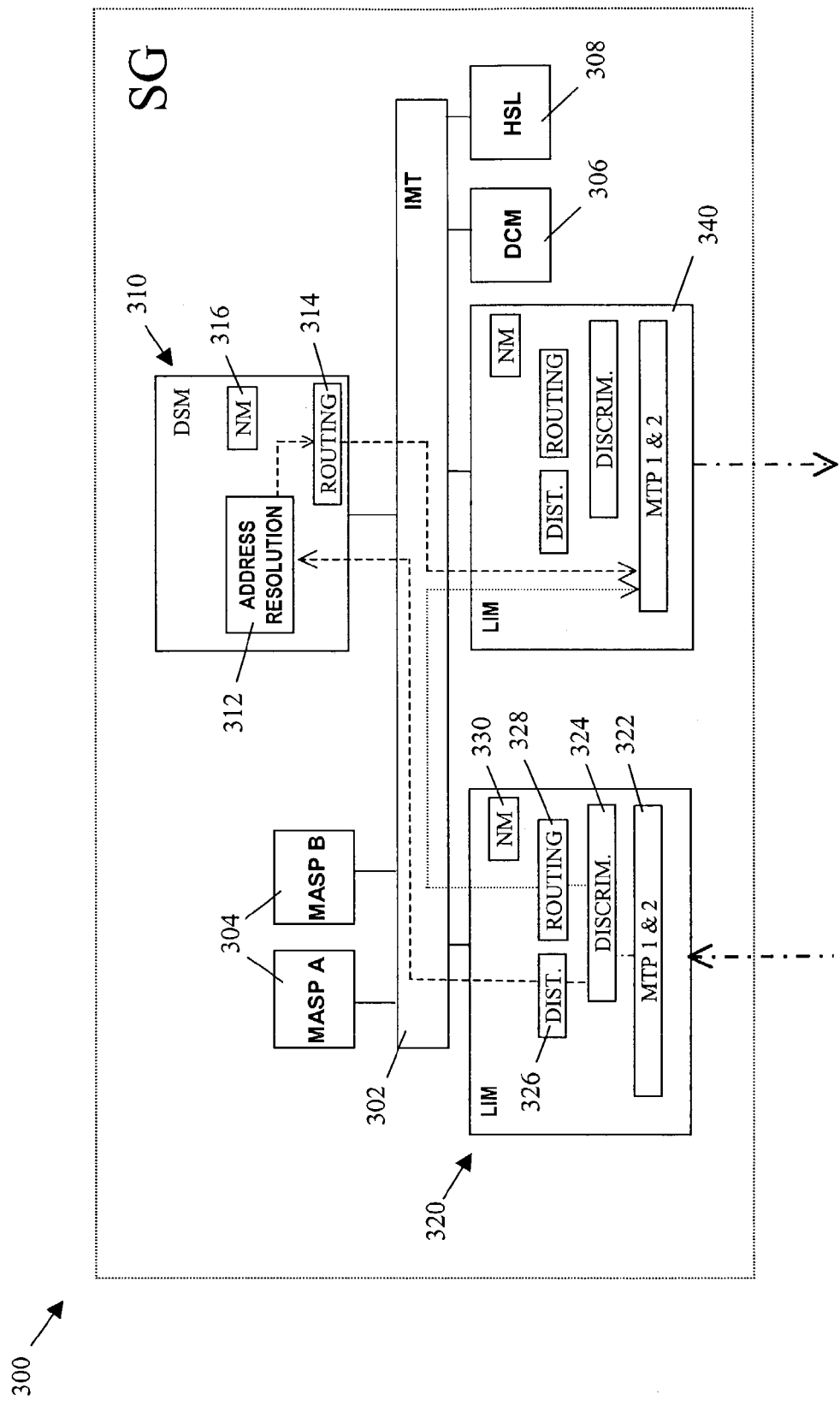
FIG. 4 is a block diagram illustrating an SG routing node configured provide default routing functionality according to an embodiment of the present invention.

FIG. 4 illustrates a signaling gateway routing node 300 including a system for routing messages using a default routing rule according to the present invention. In FIG. 4, signaling gateway routing node 300 includes a high speed interprocessor message transport (IMT) communications bus 302. A number of distributed processing modules or cards may be coupled to IMT bus 302. In FIG. 4, these processing modules or cards include a pair of maintenance and administration subsystem processors 304, an IP-capable DCM module 306, an ATM-capable HSL module 308, and a DSM module 310 that provides routing address translation or resolution service. Examples of such routing address translation or resolution services may include local number portability (LNP) service, mobile number portability service, global title translation service, or other database-related address resolution services.

DSM 310 may include an address translation or resolution function 312 and a routing function 314. Address resolution function 312 may receive a signaling message and determine a routable destination address (e.g., an SS7 point code or an IP address) for the message. Routing function 314 may select an appropriate outbound signaling linkset or socket connection based on the destination address obtained by address resolution function 312. Once the routing address is obtained, DSM 310 may transmit the message to the communication module associated with the selected linkset or socket connection. DSM 310 also includes a signaling network management (NM) function 316, NM function 316 may receive, process, and generate messages associated with the management and administration of a signaling network. Network management processes, such as NM function 316, may operate in concert with routing functions within the signaling gateway routing node to maintain and provide the status of signaling links associated with various signaling point destinations in a network.

Signaling gateway routing node 300 also includes a pair of SS7 link interface modules 320 and 340. In the illustrated example both LIMs include similar components and processes. Thus, only those relevant functional components and processes associated with LIM 320 will be described in detail herein. LIM modules 320 and 340 may be connected to many other signaling points in a network via one or more individual SS7 signaling links, where an SS7 signaling link is typically a 56 kbps or 64 kbps DS-0 link. Multiple signaling links connected to a common destination may be grouped into linksets. For IP-capable DCM modules, an IP socket connection may correspond to one or more SS7 signaling linksets.

In any event, these modules may be physically connected to IMT bus 302 such that signaling and other types of messages may be routed internally between active cards or modules. The distributed, multi-processor architecture of signaling gateway routing node 300 facilitates the deployment of multiple LIM, DCM, HSL, DSM and other cards, all of which may be simultaneously connected to and communicating via IMT bus 302.

MASP pair 304 implement the maintenance and administration subsystem functions described above. As MASP pair 304 are not particularly relevant to a discussion of the flexible routing attributes of the present invention, a detailed discussion of their function is not provided herein.

As described above, LIMs 320 and 340 provide an interface to one or more external signaling links, and are comprised of a number of sub-components. As illustrated with respect to LIM 320, these sub-components include an SS7 MTP level 1 & 2 function 322, an SS7 MTP level 3 layer message discrimination function 324, a message distribution function 326, a routing function 328, and a signaling network management (NM) function 330. MTP level 1 and 2 function 322 provides the facilities necessary to send and receive digital data over a particular physical medium, as well as to provide error detection, error correction and sequencing of SS7 messages. Message discrimination function 324 receives signaling messages from the lower processing layers and performs a discrimination function that effectively determines whether an incoming SS7 message requires internal processing or is simply to be through-switched. Examples of received SS7 messages that require internal processing include signaling connection control part messages in need of global title translation, messages requiring number portability translation service, signaling network management messages, and messages requiring other application services as described above.

For SCCP messages that require GTT processing by database services module 310, message distribution function 326 may receive such messages from discrimination function 324 and direct the messages to DSM 310 via IMT bus 302. This type of internal distribution of messages within a signaling gateway routing node should not be confused with message routing, which refers to selecting an external signaling link over which a received message should be forwarded.

Routing function 328 is responsible for examining incoming messages received from discrimination function 324 and determining on which outbound signaling link or signaling link equivalent (e.g., IP socket connection, etc.) the message is to be transmitted. Routing function 328 may transmit the message to the outbound communication module (e.g., LIM, DCM, HSL) associated with the selected signaling linkset. One important aspect of the present invention includes the manner in which routing function 328 (and similarly routing function 314) selects an outbound linkset and link when a signaling message is received.

MTP level 3 signaling network management function 330 may receive, process, and generate messages associated with the management and administration of a signaling network. Network management function 330 may operate in concert with routing function 328 to maintain and provide the status of signaling links associated with various signaling point destinations in a network. The link status information provided by NM function 330 prevents the associated routing function 328 from selecting an outbound signaling linkset or link that is unavailable.

Default Routing Rule Data Structure

Figure 5:
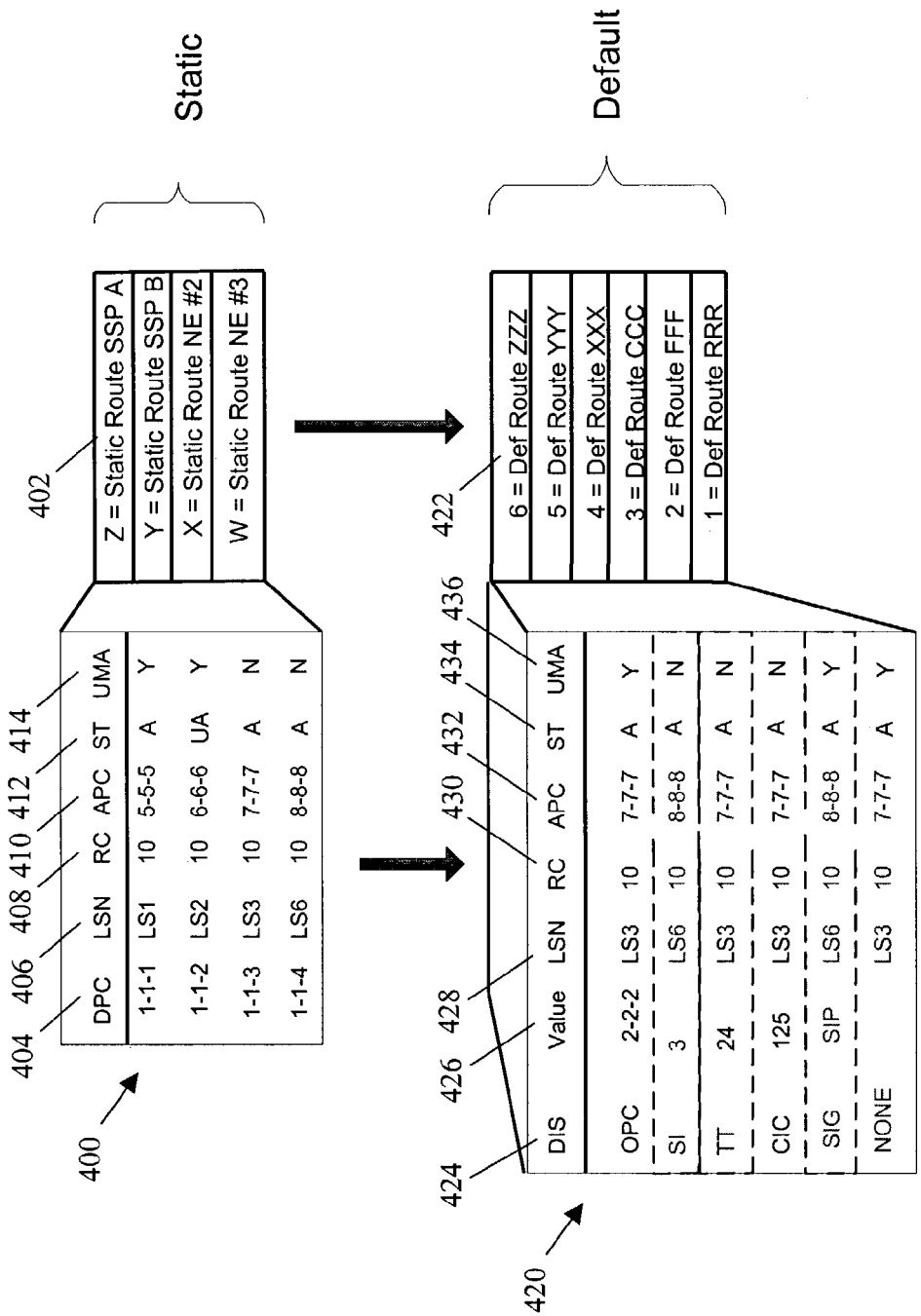
FIG. 5 is a diagram illustrating an exemplary default routing data structure that is utilized in one embodiment of the present invention.
Figure 6A:
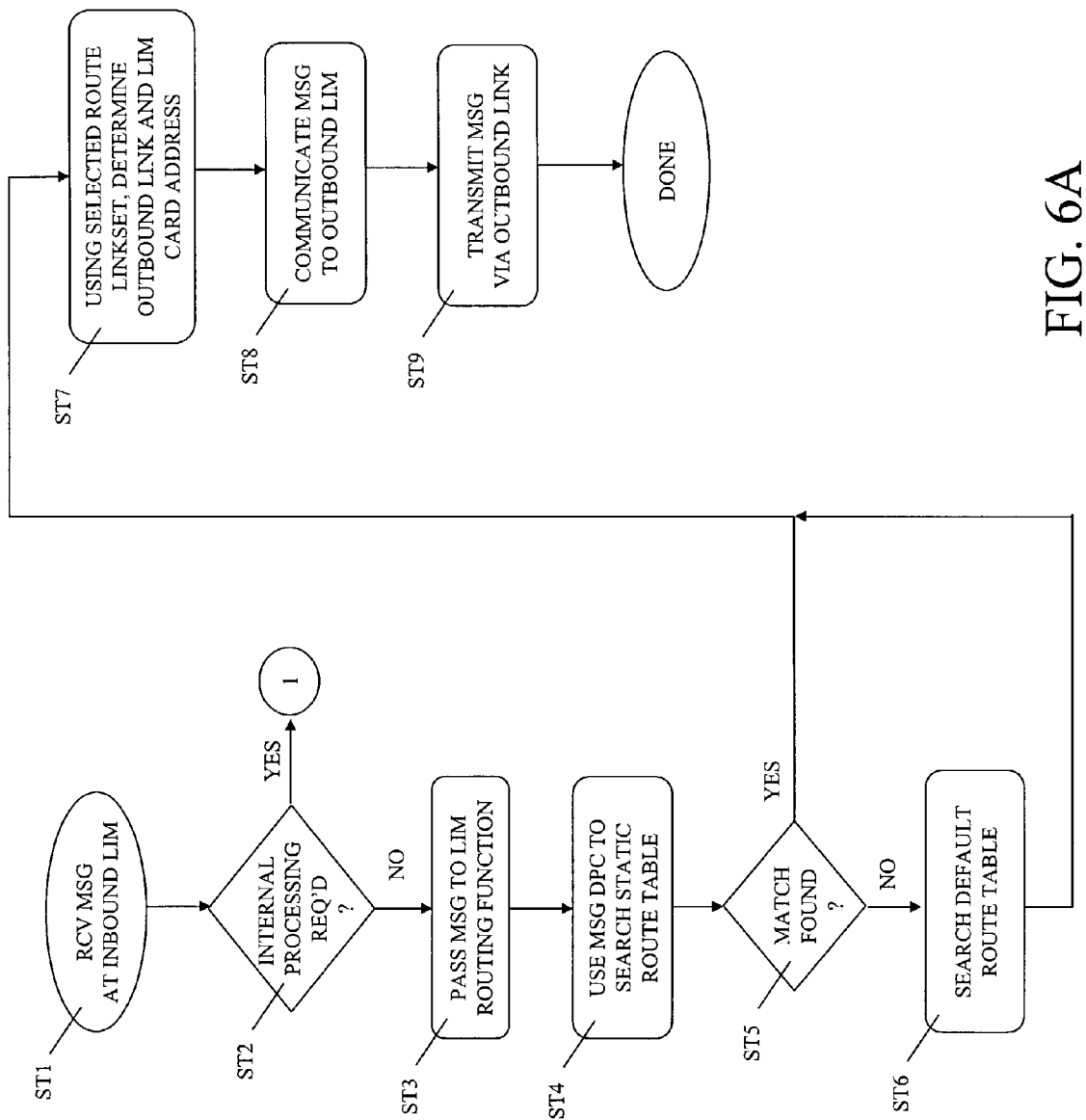
FIGS. 6A and 6B are process flow diagrams illustrating default routing processing according to an embodiment of the present invention.
Figure 6B:
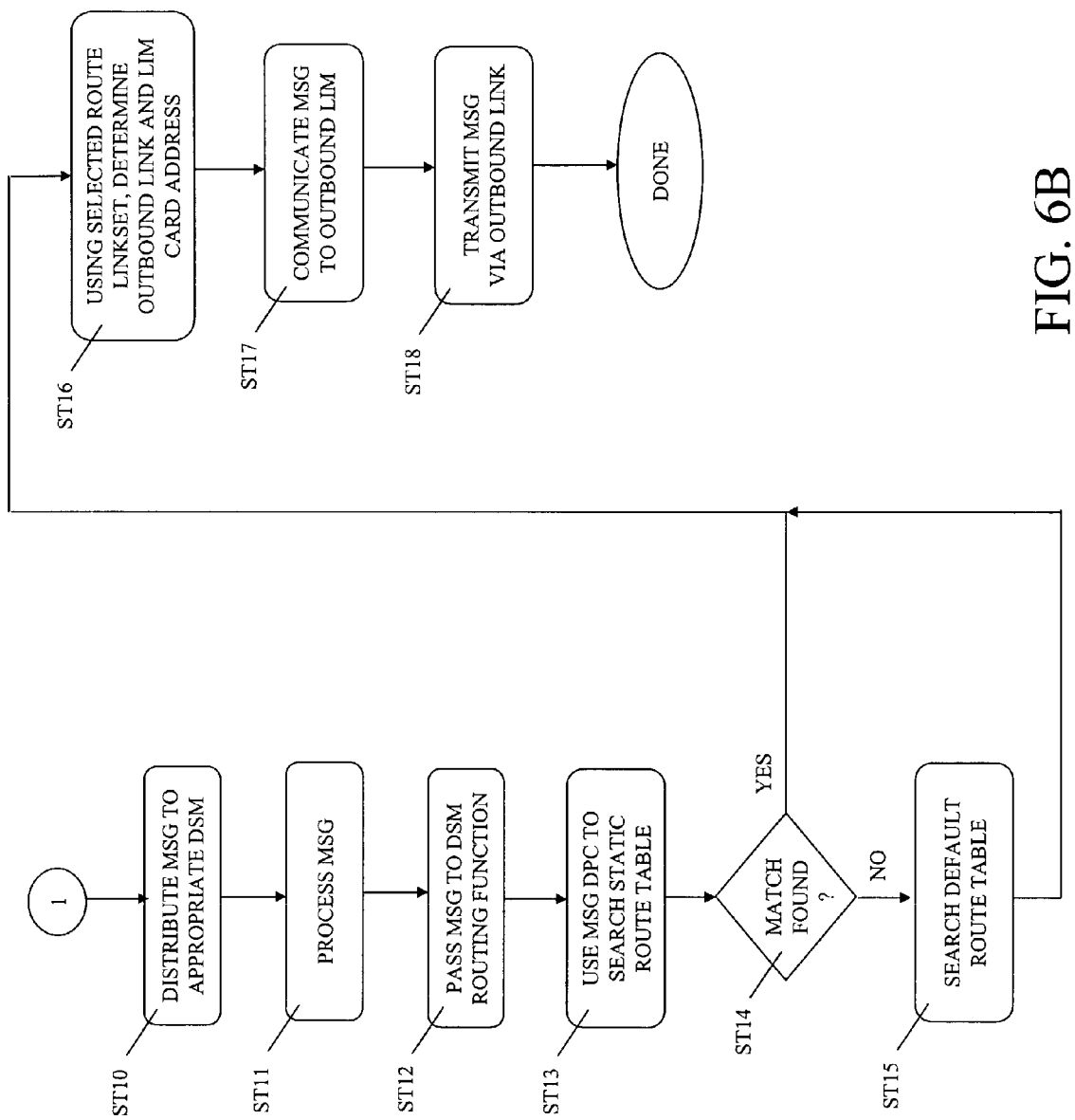

FIG. 5 is a diagram illustrating an exemplary routing rule data structure associated with one embodiment of a default routing node of the present invention. More particularly, the exemplary routing rule data structure shown in FIG. 5 may be used by routing functions, such as routing functions 314 and 328, within a signaling message routing node. In the illustrated example, the routing data structure includes a static routing table 400. Each entry in static routing table 400 includes a route identifier field 402, a DPC field 404, a linkset name field 406, a route cost field 408, an adjacent point code field 410, a route status field 412, and a usage measurements and accounting field 414. Route identifier field 402 stores a static route corresponding to the DPC value in DPC field 404. Linkset name field 406 stores the name of the linkset associated with the outbound route. Route cost field 408 stores a cost associated with the route. Adjacent point code 410 stores the point code of a node at the distant end of the linkset corresponding to the route. Route status field 412 stores the status of the route, i.e., whether the route is available or unavailable. Usage measurements and accounting field 414 stores an indicator as to whether usage measurements or accounting/billing processing is required for messages routed to a particular linkset.

The exemplary data structure shown in FIG. 5 also includes a default routing table 420. Each entry in default routing table 420 includes a default route identifier field 422, a discrimination parameter identifier field 424, a discrimination parameter value field 426, a linkset name field 428, a route cost field 430, an adjacent point code address 432, a route status field 434, and a usage measurements and accounting field 436. Default route identifier field 422 stores a default route for each discriminator stored in discrimination parameter field 424. Discrimination parameter field 424 stores discrimination parameters that may be used to distinguish among default routes. It should be noted that the parameters in discrimination parameter field 424 preferably do not include a destination point code. Thus, when a signaling message routing node with a default routing table such as that illustrated in FIG. 5 receives the signaling message that includes a destination point code which is not present in routing table 400, rather than discarding the message, the message may be routed to one of the default routes indicated in default routing table 420. Linkset name field 428, route cost field 430, adjacent point code field 432, route status field 434, and usage measurements and accounting field 436 store similar values to the corresponding values in static routing table 400. Network management functions 316 and 330 send and receive network management messages, and generally administer route status information such as that contained in route status fields 412 and 434.

As described above, default routes stored in default routing table 420 may be selectable based on non-DPC discrimination parameters stored in discrimination field 424. Exemplary discrimination parameters may include an SS7 OPC, an origination IP address, an SS7 circuit identification code (CIC), an SS7 translation type (TT), an SS7 numbering plan (NP), an SS7 nature of address (NAI), an SS7 service indicator (SI), and a signaling protocol type. SS7 OPC parameter and origination IP address values may be specified completely or provided in a partially wildcarded format. Signaling protocol types that may be used as discriminators in discriminator field 424 include SS7 ISDN user part, SS7 transaction capabilities application part (TCAP), mobile application part (MAP), session initiation protocol (SIP), H.225), and/or various signaling message payload protocol types (e.g., short message service (SMS), multimedia messaging service (MMS), etc.). Default routing table 420 preferably includes one entry with a null value in discriminator field 424, so as to create a global default routing rule. A global default rule may be included in default routing rule table 420 along with other non-null discrimination parameter routing rules provided that the non-null discrimination parameter routing rules are searched first. A default routing rule may include a logical combination of different discrimination parameters (e.g., TT=24 OR OPC=6-6-6). A default routing rule may also include a logical combination of the same discrimination parameters, where the parameters are assigned different values (e.g., TT=24 OR TT=10).

Once a linkset is selected using table 400 or table 420 illustrated in FIG. 5, a signaling link within the linkset must be selected. Table 2 shown below illustrates exemplary signaling link associations that may be used by a routing function to select a particular signaling link once a route or linkset has been chosen either explicitly or by default.

TABLE 2

| | Signaling Link Information | | | |
|---|---|---|---|---|
| LinkSet | Link ID | IMT Bus Address | Comm Port | Link Status |
| LS1 | SL1 | 1410 | A | Avail |
| | SL2 | 2410 | B | UnAvail |
| | SL3 | 3410 | A | Avail |
| LS2 | SL1 | 1412 | B | Avail |
| | SL2 | 2412 | B | Avail |
| LS3 | SL1 | 4210 | A | Avail |
| | SL2 | 5210 | B | Avail |
| | SL3 | 6210 | A | Avail |
| LS6 | SL1 | 1410 | B | UnAvail |
| | SL2 | 1412 | A | Avail |

As indicated in Table 2, each entry associates one or more individual signaling links with each signaling linkset identifier. Each entry in Table 2 also associates an IMT communication bus card slot address and card specific communication port identifier with each signaling link. A link status indicator in each entry indicates whether a signaling link is available for use. Lower layer MTP functions, such as MTP level 1 and 2 function 322 administer and communicate link status information such as that contained in the link status field.

With regard to the default discrimination parameters described above, one significant aspect of the present invention involves the implementation of a routing algorithm that enables a signaling message to be routed based on a parameter other than a destination network address (e.g., an SS7 DPC), once it is determined that a routing for the destination network address specified in the message is not defined. For example, referring to the sample route data in static routing table 400 of FIG. 5, if a signaling message is received from OPC=2-2-2 and is destined for DPC=5-5-5, a matching entry in static routing table 400 would not be located, as there is no route to 5-5-5 provisioned. According to the present invention, once a lookup in static routing table 400 fails, a lookup is performed in default routing table 420. In this example, the signaling message is assumed to have an OPC value of 2-2-2. This value may be used to search default routing table 420. Since the first entry in default routing table 420 corresponds to the OPC of 2-2-2, the first entry results in a match. The corresponding linkset name obtained from dynamic routing table 420 is therefore LS3. Consequently, the message would be routed to the adjacent signaling point, 7-7-7 over LS3. The adjacent signaling point may have a route to the DPC in the signaling message (5-5-5) provisioned in its static routing table. If the adjacent signaling point does not have a route to 5-5-5 defined in its static routing table, another default routing rule may be applied or the message may simply be discarded.

Such default routing capability in a signaling network routing node stands in sharp contrast to the teachings and recommendations of the above-referenced industry standards documents. As stated above, the industry standards documents require that a message be discarded if no entry exists in the routing table and do not mention default routes or default routes based on non-DPC parameters. The present invention avoids this problem by providing default SS7 routing rules. Using such default routing rules, the present invention decreases the likelihood that messages will be dropped as new nodes or added to the network.

One particularly useful implementation of a signaling message routing node with default routing capability of the present invention involves the deployment of small, relatively limited capacity, network routing nodes around the edge of a signaling network. Such routing nodes are often referred to as edge routers. It is typically the case with edge routers, because of their small size and limited resources, that large static routing tables cannot be maintained and/or are not cost effective. For example, a typical edge router may have the internal data storage resources to maintain that static routing table that contains 64 routes. In contrast, a large high-performance core network signal transfer point may have the data storage resources to store approximately 10,000 routes. Consequently, it would be advantageous to deploy small, inexpensive, edge routers that have limited static routing rule capabilities, yet can default route certain messages to a core signaling router that has a larger, more robust static route database.

Default Routing Algorithm

Operation of a signaling gateway routing node implementation of a default routing algorithm of the present invention may be better understood by considering FIGS. 4, 5, 6A and 6B. Beginning with the exemplary signaling gateway routing node architecture shown in FIG. 4, an SS7 signaling message is received at the routing node 300 via LIM 320. This step is identified as step ST1 in the accompanying process flow diagram presented in FIG. 6A. Once lower layer MTP processing has been successfully performed, the message is passed to LIM discrimination function 324, where a number of screening checks may be performed, including a check to determine whether the message requires internal processing by the signaling gateway node (e.g., LNP translation, GT translation, etc.), as indicated in step ST2. In FIG. 4, discrimination function 324 determines that the message does not require internal processing, and the message is passed to LIM routing function 328 (ST3). Routing function 328 examines an SS7 DPC value contained in the routing label of the message and searches static routing rule table 400 (FIG. 5), as indicated in step ST4. For purposes of illustration, the received message is assumed to contain the following parameter values: a DPC value of 5-5-5, and OPC value of 9-9-9, and an SI value of 3. A search of static routing rule table 400 does not yield a match, since there is no DPC-based routing rule defined for messages destined for the SS7 point code 5-5-5 (ST5). Because there is no DPC-based routing rule defined for messages destined to point code 5-5-5 in static routing rule table 400, a search is performed in the default routing rule table 420 (FIG. 5), as indicated in step ST6. In this example, multiple default routing rules have been defined in default table 420, with each default rule being associated with a particular discrimination parameter or a null parameter value. In this example, default routing rules table 420 is searched sequentially beginning with the first entry in the table. The present invention is not limited to sequential table searches. Other default table search order algorithms may be used without departing from the scope of the present invention. In any event, a match is located at the second default routing table entry (i.e., the message SI parameter has a value of 3). Routing information, including an outbound linkset, is extracted from the matching default routing rule. Using the outbound signaling linkset identifier, an available signaling link is selected using signaling link information such as that described above with respect to Table 2 (ST7). The message is then communicated, via the IMT bus 302, to the corresponding communication module associated with the selected outbound signaling link, as indicated in step ST8. In this example, the communication module associated with the selected outbound signaling link is LIM 340, as shown in FIG. 4. Once received by LIM 340, the message is transmitted via the selected outbound signaling link to an adjacent signaling point (ST9), and routing operation at the signaling gateway is complete.

Returning now to processing step ST2, if LIM discrimination function 324 determines that the message does require internal processing (e.g., LNP translation, GT translation, etc.), the message is passed to LIM distribution function 326, where it is determined to which application processor module the message should be directed (ST10). For example, DSM module 310 may be configured to provide number portability (NP) address resolution/translation service, and the received message may be associated with a call to a ported subscriber. In this case, the received message is directed by LIM distribution function 326 to DSM 310 for routing address resolution processing via function 312, as shown in FIG. 4. Once number portability routing address resolution has been performed (ST11), the NP translated message is passed to DSM routing function 314, as indicated in step ST12. In an manner similar to that described above with respect to LIM routing function 328, DSM routing function 314 examines an SS7 DPC value contained in the routing label of the message and searches static routing rule table 400 (FIG. 5), as indicated in step ST13. For the purposes of illustration, the NP translated message is assumed to contain the following parameter values: a DPC value of 8-8-8, and OPC value of 9-9-9, and an SI value of 5. A search of static routing rule table 400 does not yield a match, since there is not an explicit routing rule defined for messages destined for the SS7 point code 8-8-8 (ST14). Because there is no DPC-based routing rule defined for messages destined to point code 8-8-8 in static routing rule table 400, a search is performed in the default routing rule table 420 (FIG. 5), as indicated in step ST15. Once again, in this example, multiple default routing rules have been defined in default table 420, with each default rule being associated with a particular discrimination parameter or a null parameter value. As described above, default routing rules table may be searched sequentially beginning with the first entry in the table. In this example, a match is located at the last global default routing table entry, since there was not a match with any of the defined discrimination parameters. Routing information, including an outbound signaling linkset, is extracted from the matching global default routing rule. Using the outbound signaling linkset identifier, an available signaling link is selected using signaling link information as illustrated above in Table 2 (ST16). The message is then communicated, via IMT bus 302 to the corresponding communication module associated with the selected outbound signaling link, as indicated in step ST17. Once again, in this example, the communication module associated with the selected outbound signaling link is LIM 340, as shown in FIG. 4. Once received by LIM 340, the message is transmitted via the selected outbound signaling link to an adjacent signaling point (ST18), and routing operation at the signaling gateway is complete.

Dynamic Default Routing Algorithm Embodiment

An alternate embodiment of the default routing algorithm of the present invention allows an operator to designate a portion of the routing rule data structure for statically provisioned routes and a portion for automatically provisioned dynamic routes. From practical standpoint, when an operator wishes to provision a network routing element with only its directly adjacent routes, then these routes could be configured as permanent static routes and would not be subject to removal or "bumping", and as such, a certain number of protected guaranteed routes will always be present in the static portion of the routing rule data structure. As described above, the routing rule data structure also includes one or more default routing rules. In addition to the static and default routing tables described above, a routing rule data structure of the present embodiment may include a dynamic component corresponding to the most commonly used default routing rules. These explicit routing rules are similar in format to static routes, expect that they are not permanent and consequently may be "bumped" or replaced as necessary (either manually or automatically). The primary purpose for inclusion of a dynamic routing rule component involves the improved operational performance associated with searches of this routing rule data structure. By using a utilization metric (e.g., number of accesses per unit time) in association with a longest-time-in-the-queue metric as the "bump" criteria, the routing rule data structure will, in a relatively short amount of time, construct a dynamic table of the most accessed point codes.

An operator may determine the exact ratio of dynamic to static routes present in the routing rule data structure, which may effectively tune the system improve overall system performance as call patterning is established. Efficiency is gained in situations where a particular default route is used with high frequency, resulting in repeated searches of the default routing rule table. If the default routing rule table contains many default rules, or many complex default rules (i.e., logical expressions containing multiple discrimination parameters or parameter values), such default routing table lookup operations may be relatively time consuming, compared to a high-speed search of a well ordered data table. By automatically inserting an entry associated with a particular instance of a default routing rule in the dynamic table component of the data structure, the need to repeatedly search the default routing rule table may be avoided for certain high use routes.

Figure 7:
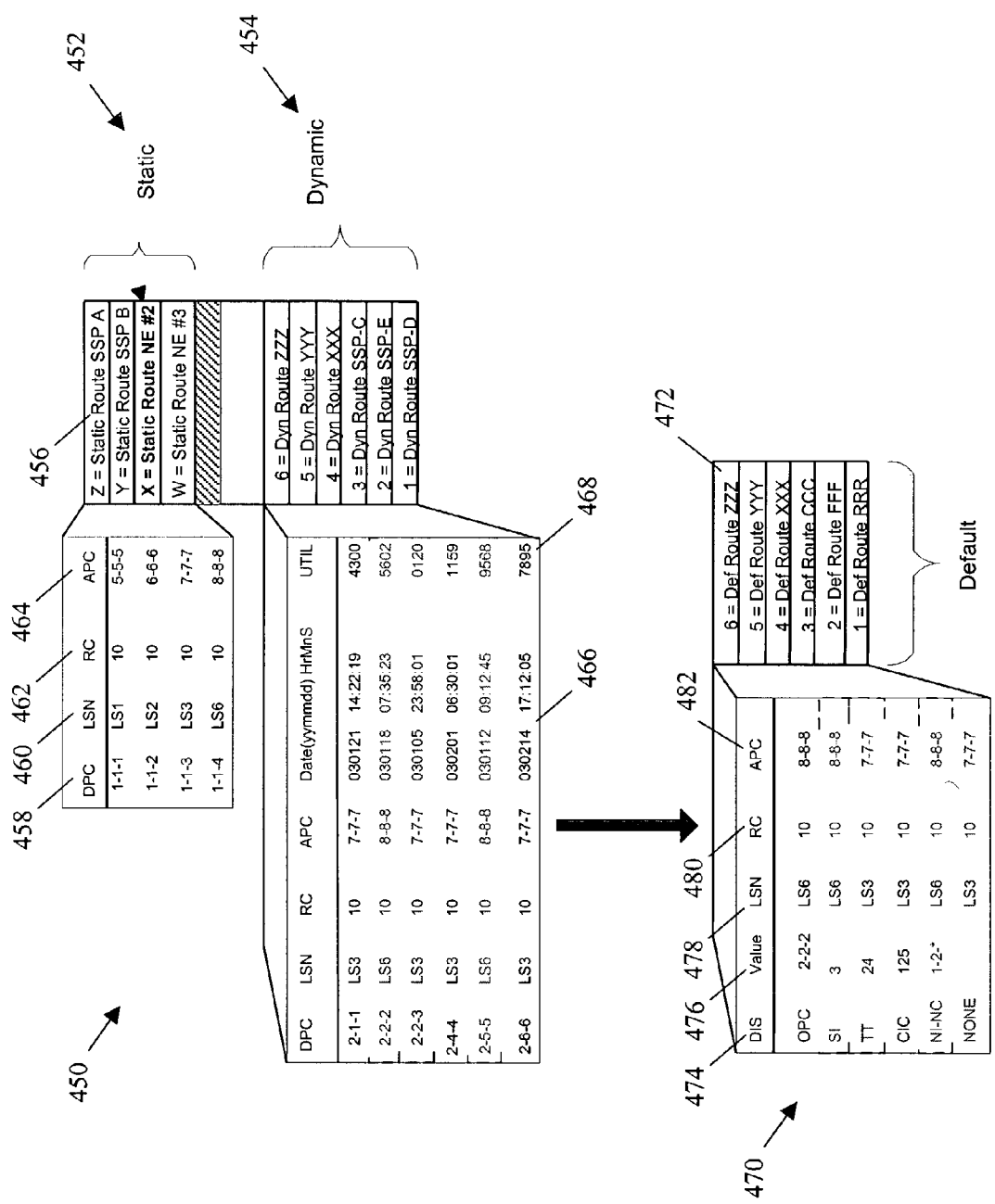
FIG. 7 is a diagram illustrating an exemplary default routing data structure that includes a dynamic routing table utilized in default routing according to an embodiment of the present invention.

A sample default routing data structure, which incorporates a dynamic routing rule component, is presented in FIG. 7. Referring to FIG. 7, the data structure includes a DPC-based rule table 450, which has a static routing rule component 452 and a dynamic routing rule component 454. Each entry in both the static and dynamic routing rule components of table 450 includes a route identifier 452, destination point code (DPC) address field 454, a linkset name field 456, a route cost field 458, an adjacent point code address field 460, in a manner similar to that described with respect to the previous embodiment. Although not illustrated in FIG. 7, table 450 may also include a route status field, and a usage measurements and accounting field, as described with respect to the previous embodiment. Dynamic routing rule table component 454 includes two additional fields, a last accessed date/time stampfield 466 and an access utilization metric field 468. As described above, one example of an access utilization metric is a measure of the number of times a dynamic routing rule is accessed per hour.

While static routes permanently reside in table 452, routing rules that populate the dynamic routing table component may be added or deleted over time. In one embodiment, a routing rule may be added to or removed from dynamic table 454 component each time a default routing rule is invoked. For example, in FIG. 7, if an MSU with an originating point code of 2-2-2 and a destination point code of 8-8-8 is received, a lookup will first be performed in routing data structure 450 using the DPC. Since none of the entries in data structure 450 correspond to the DPC value of 8-8-8, a lookup will be performed in default routing table 270. In default routing table 270, a message with an OPC of 2-2-2 matches the first entry. Since the destination point code in the received message is 8-8-8, a new entry may be added to dynamic routing table 454 with 8-8-8 as the DPC, LS6 as the corresponding linkset name, 2-2-2 as the APC, the current time as the timestamp, and a utilization value as calculated below.

In the process of adding the new dynamic rule to the fully populated dynamic table component, an existing rule in the dynamic table must be removed in order to conserve table size. The rule removal or "bumping" algorithm, in one embodiment, may be based on routes that have the least amount of utilization and have been there the longest amount of time. Utilization may be determined by resetting the timestamp on a route every time the route is accessed and recalculating the utilization metric. This calculation allows the least used routes to appear as though they have been present the longest amount of time and have the smallest utilization, consequently making them prime candidates for removal from the dynamic component of routing rule table 450. In an alternate embodiment, the converse of the algorithm described above could also be applied to routing rule "bumping", which is that the routes that have been there the least amount of time could be removed. However, this has a weakness in the fact that one call may beget another call to the same destination. If the shortest timestamp were used as the discriminator, then in a busy system with many calls the most recent calls would always be replaced. This could lead to unnecessary processing by the system.

In one embodiment, bump criteria is based on two factors, utilization combined with overall time in the routing table, where utilization is based on the number of bytes transmitted * the number of MSUs to each destination over a period of time. Received bytes are of no interest. The time period may be configurable, with perhaps a 30 minute default value. The sample state information shown below in Table 3 illustrates examples of dynamic route "bump" rankings.

TABLE 3

"Bump" Ranking Example

Current Date: 030222    Current Time: 23:00

| DPC | Date (yymmdd) | Time (hhmmss) | Utilization (byte/sec) | Bump Ranking |
|---|---|---|---|---|
| 1-2-3 | 030115 | 073552 | 149 | 2 |
| 5-8-9 | 030110 | 192565 | 256 | 3 |
| 10-52-70 | 030120 | 080506 | 300 | 4 |
| 255-20-56 | 030201 | 110009 | 105 | 1 (lowest Utilization) |
| 15-59-65 | 030222 | 145623 | 1125 | 5 (Highest Utilization) |

In addition to DPC-based routing table 450 the data structure illustrated in FIG. 7 also includes a default routing rule table 470, which is similar in form and function to the default routing rule table described above. Default routing rule table 470 includes a default route identifier field 472, a discrimination parameter identifier field 474, a discrimination parameter value field 476, and a linkset name field 478. Although not illustrated in FIG. 7, default table 470 may also include a route status field, and a usage measurements and accounting field, as described above with respect to the previous embodiment.

From an operational standpoint, the static/dynamic default routing rule algorithm is very similar to the default routing algorithm described above with respect to FIGS. 6A and 6B. That is, a lookup is first performed in static/dynamic explicit DPC-based routing rule table structure 450, and, if a match is not found, a subsequent search is performed in the default routing table 470. Once again, the primary benefit of the static/dynamic embodiment involves improving performance via decreasing default table lookup processing requirements.

Message Accounting Subsystem

In one embodiment, a routing process may generate message accounting information associated with a signaling message that is routed via a particular route/linkset. This accounting information may be a copy of some or all of the signaling message, or the accounting information may be a new message that contains information associated with the signaling message. Date and timestamp information may also be included in the accounting message. These messages may be temporarily buffered on each processing module, and eventually extracted for post-processing operations. Peg count-type accounting/billing information may also be collected and temporarily buffered for future analysis and use. An example of such accounting information is shown below in Table 4.

TABLE 4

Message Accounting Information

| Date | Time | DPC | LinkSet | Disc Param | Disc Value |
|---|---|---|---|---|---|
| Oct. 10, 2002 | 11:23:02 | 244-2-1 | LS5 | OPC | 2-2-2 |
| Oct. 10, 2002 | 11:43:05 | 244-2-1 | LS5 | TT | 24 |

Each entry in Table 4 includes message date and time fields, a message DPC field, selected route or linkset identifier field, a discrimination parameter field, and a discrimination parameter value field. Such accounting information may be used to maintain data or statistics relevant to the number of messages requiring default routing service, and this information may be used to improve overall router performance via routing rule modifications. This information may also be used to generate bills related to message routing and/or transport.

Thus, as described above, the present invention enables a network operator to provision a route database with a list of DPC-based routing rules and one or more default routing rules. Default routing rules may include one or more discriminators, and the default routing rule data structure may be searched using a sequential lookup algorithm or a non-sequential lookup algorithm. If a sequential lookup algorithm is employed, default routing rules may be effectively prioritized via their position in the lookup table.

Through the use of a default routing algorithm of the present invention, a network operator may provision a network routing element with as many static routes as desired, within the maximum limits of the routing table size. These static routes are configured as permanent routes and are not be subject to treatment by the default route. This allows a certain number of protected, explicit routes to always be present in the system's static routing table. The network operator may determine the exact number of static routes present in the table at any one time. Any message bound for a DPC that is not explicitly specified in static routing table would be passed to the default routing table and would be routed based on the default route that most closely matches the discriminators in the default routing table. Default routes are routes that are applied to incoming messages that require routing to a destination that is not explicitly configured in the routing table of a network routing element. Default routing allows the routing of all received messages to at least the next network element where the route to the final destination is subsequently determined by a routing element with a more robust routing rule database. This prevents messages from being discarded due to a lack of routing information at the invention node.

According to another aspect of the invention, a routing data structure may include a DPC-based component with static and dynamic routing tables and a default component. For each received message, a lookup is first performed in the DPC-based component. If no match is present, a lookup is performed in the default component. The result of the lookup in the default component may be used to create a new DPC-based entry. The new DPC-based entry may be added to the DPC-based component of the routing data structure. In order to prevent the DPC-based component of the routing data structure from growing to an unmanageable size, the new DPC-based entry may replace an existing entry in the DPC-based component of the routing data structure. The entry selected for replacement may be determined based on its relative utilization with regard to other entries in the DPC-based component of the routing data structure.

It will be understood that various details of the invention may be changed without departing from the scope of the invention. Furthermore, the foregoing description is for the purpose of illustration only, and not for the purpose of limitation the invention being defined by the claims.

What is claimed is:

1. An SS7 signaling message routing node comprising:
   (a) a signaling link interface module for sending and receiving SS7 signaling messages;
   (b) a routing rule data structure associated with the signaling link interface module, the routing rule data structure including a first routing rule component having SS7 signaling message routing rule entries based on SS7 destination address information and a second routing rule component having at least one default SS7 signaling message routing rule entry that is not based on destination address information; and
   (c) a message routing function associated with the routing rule data structure for using SS7 destination information in a received SS7 message to initially search for a matching entry in the first routing rule component, and, in response to failing to locate a matching entry in the first routing rule component, for searching the second routing rule component for a matching entry.

2. The SS7 signaling message routing node of claim 1 wherein the signaling link interface module comprises a signaling system 7 (SS7) signaling link interface module.

3. The SS7 signaling message routing node of claim 1 wherein the signaling link interface module comprises an SS7-over-internet protocol (IP) signaling link interface module.

4. The SS7 signaling message routing node of claim 1 wherein the received message comprises an SS7 message signaling unit.

5. The SS7 signaling message routing node of claim 1 wherein the received message comprises an SS7 over IP signaling message including an Internet Engineering Task Force (IETF) SS7 adaptation layer.

6. The SS7 signaling message routing node of claim 1 wherein each routing rule entry associated with the first routing rule component of the data structure includes an SS7 destination point code (DPC) component.

7. The SS7 signaling message routing node of claim 6 wherein the DPC component associated with each routing rule entry associated with the first routing rule component includes a network identifier.

8. The SS7 signaling message routing node of claim 1 wherein each routing rule entry associated with the second routing rule component of the routing rule data structure includes wildcard values for each of: a network identifier, a network cluster, and a cluster member segment of an SS7 DPC.

9. The SS7 signaling message routing node of claim 1 wherein each routing rule entry associated with the second routing rule component of the routing rule data structure includes a non-DPC discriminator.

10. The SS7 signaling message routing node of claim 1 wherein the first routing rule component includes static entries and dynamic entries, and wherein the message routing function is adapted to replace one of the dynamic entries with a new dynamic entry based on a lookup in the second routing rule component and relative utilizations of existing dynamic entries.

11. The SS7 signaling message routing node of claim 10 wherein the new dynamic entry comprises a DPC-based routing rule entry.

12. The SS7 signaling message routing node of claim 1 including a message accounting function module that is associated with the message routing function, which is adapted to collect message route usage information.

13. The SS7 signaling message routing node of claim 1 wherein the signaling link interface module, the message routing function, and the routing rule data structure are components of an SS7 signal transfer point (STP).

14. A method for selecting a signaling message routing rule and for routing an SS7 signaling message, the method comprising:
   at an SS7 signaling message routing node:
   (a) receiving an SS7 signaling message that requires routing;
   (b) searching a first set of SS7 signaling message routing rule entries based on a destination address value contained in the message, wherein each SS7 signaling message routing rule entry in the first set includes a destination point code (DPC);
   (c) in response to failing to locate a matching entry in the first set of routing rules, searching a second set of SS7 signaling message routing rule entries for a matching entry, the second set of SS7 signaling message routing rule entries including at least one entry containing a non-DPC-based SS7 routing rule; and
   (d) in response to locating a matching entry in the second set of SS7 routing rule entries, using the matching entry to route the message.

15. The method of claim 14 wherein receiving an SS7 signaling message includes receiving an MTP-routed SS7 signaling message over an SS7 signaling link.

16. The method of claim 14 wherein receiving an SS7 signaling message includes receiving an SS7 over IP signaling message that includes an Internet Engineering Task Force (IETF) SS7 adaptation layer.

17. The method of claim 14 wherein each routing rule entry in the first set of routing rule entries includes an SS7 network identifier.

18. The method of claim 14 wherein each routing rule entry in the second set of routing rule entries includes wildcard values for each of a network identifier, a network cluster, and a cluster member segment of an SS7 DPC.

19. The method of claim 14 wherein searching the second set of routing rule entries for a matching entry includes using a non-DPC discriminator key to locate a matching routing rule entry.

20. The method of claim 14 comprising, in response to locating the matching entry in the second set of routing rule entries, creating a new DPC-based entry based on the matching entry, and replacing an entry in the first set of routing rule entries with the new DPC-based entry.

21. The method of claim 20 wherein replacing an entry with a new DPC-based entry includes replacing a least-recently-used entry in the first set of routing rule entries.

22. The method of claim 14 including collecting and reporting message routing rule usage information for routing rule entries in the second set.

23. The method of claim 14 wherein performing steps (a)-(d) at an SS7 signaling message routing node includes performing steps (a)-(d) at a signal transfer point.

24. A computer readable medium having stored thereon a data structure comprising:
 (a) a plurality of SS7 destination point code (DPC)-based signaling message routing table entries, each DPC-based routing table entry including a first field storing a DPC-based index and a second field storing an outbound signaling link set identifier corresponding to the DPC-based index; and
 (b) at least one non-DPC-based signaling message routing table entry, the non-DPC-based routing table entry including a first field storing a non-DPC-based index and a second field for storing an outbound signaling link set identifier corresponding to the non-DPC-based index,
 wherein the computer readable medium comprises a memory, wherein the data structure is stored in the memory, and wherein the memory is accessible by a message routing function to route signaling messages using the DPC-based and non-DPC-based signaling message routing table entries.

25. The computer readable medium of claim 24 wherein the first field in at least one of the DPC-based routing table entries stores a full SS7 point code.

26. The computer readable medium of claim 24 wherein the first field in at least one of the DPC-based routing table entries stores a partial SS7 point code.

27. The computer readable medium of claim 24 wherein the DPC-based routing table entries include dynamic entries being replaceable based on usage of the non-DPC-based entries.

28. The computer readable medium of claim 24 wherein the first field in the non-DPC-based routing table entry stores at least one of: an OPC, a signaling indicator, a translation type, and a protocol type.

29. The computer readable medium of claim 24 wherein the first field in the non-DPC-based routing table entry stores a wildcard value.

* * * * *